(No Model.)

J. J. McCOMISH.
TIRE FOR BICYCLE WHEELS.

No. 489,975. Patented Jan. 17, 1893.

Witnesses.
James W. Williams
A. E. Perce

Inventor.
John J. McComish
by Warren R. Perce
Atty.

UNITED STATES PATENT OFFICE.

JOHN J. McCOMISH, OF PROVIDENCE, RHODE ISLAND.

TIRE FOR BICYCLE-WHEELS.

SPECIFICATION forming part of Letters Patent No. 489,975, dated January 17, 1893.

Application filed September 29, 1892. Serial No. 447,236. (No model.)

*To all whom it may concern:*

Be it known that I, JOHN J. McCOMISH, of the city and county of Providence, in the State of Rhode Island, have invented a certain new Improvement in Tires for Bicycle-Wheels; and I declare the following to be a specification thereof, reference being had to the accompanying drawings.

Like letters indicate like parts.

Figure 1:
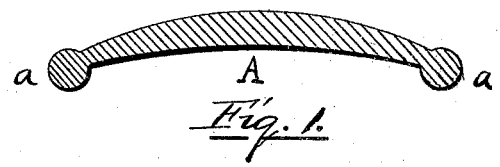
Figure 2:
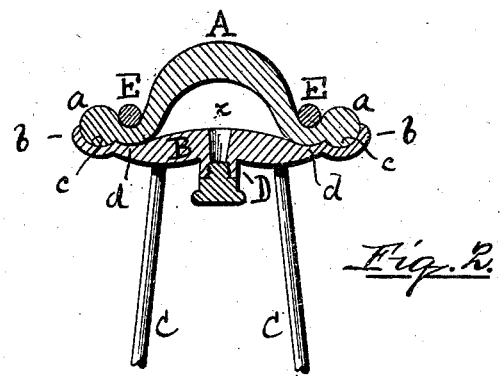
Figure 3:
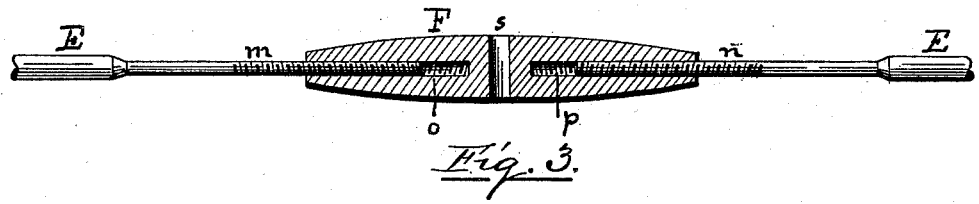

Figure 1 is a view of my improved tire in cross-section. Fig. 2 shows the same in position upon the bicycle wheel, and the manner of fastening thereto, said figure being in section upon that radius of the wheel, which passes through the air-tube. Fig. 3 is an enlarged view, in longitudinal section, of the nut, by which the tire-fastening wires are drawn tightly around the wheel and tire, said wires being shown in the figure in side elevation.

My invention relates to the wheels of bicycles and similar vehicles, and my invention consists of a metallic rim of the wheel, made in a suitable form, with flanges and grooves, in combination with a rubber strip or tire, which is somewhat wider than said wheel-rim, and which is made with a bead on each side thereof, lengthwise, and fastening the tire, upon the rim, by a wire-band, with means of tightening the same, by which combination, a pneumatic tire, with auxiliary side-tires, is provided, as hereinafter particularly specified.

In the drawings, A represents the tire, which is made of india-rubber, or other suitable elastic material. It is substantially a flat strip of solid rubber with an enlarged rounded edge or bead $a$, integral therewith, and extending longitudinally on both sides. One surface of the tire may be made convex, so as to obtain a central longitudinal thickening to resist wear and tear. The tire should be of a somewhat greater width than the rim of the wheel.

B is the metallic rim of the bicycle wheel, seen in Fig. 2 in cross-section. It has a circumferential flange $b$ on each side, which is grooved or hollowed as at $c$. There are also circumferential grooves $d$ upon said rim, as shown in said figure.

C C are the spokes supporting the rim B, and D is an air-tube, the end of which toward the hub, is closed by a screw-cap, properly packed, or by any suitable plug.

E E are wires of steel, copper, or other suitable material. Their ends are provided with screw-threads $m$ $n$, the one a right-handed and the other a left-handed thread.

F is a nut, having the two bores $o$ $p$, adapted to receive and engage with the ends $m$ $n$ of one of the wires E, said bores being cut with a right-handed and a left-handed screw-thread, respectively, for that purpose. The nut F has a transverse hole or opening $s$, adapted to receive a rod, or other suitable piece, which will serve as a lever to turn the nut, when it is in engagement with the ends of the wire.

In attaching the rubber tire to the wheel-rim, one of the beaded edges $a$ of the tire A is brought into position within the circumferential groove $c$ of the flange $b$, as shown in Fig. 2, and one of the wires E is placed around the wheel, close to the inside curve of said bead. The screw-threaded ends $m$ $n$ of the wire E are inserted into the screw-threaded openings $o$ $p$ of the nut F, and by means of a rod or lever, inserted in the hole $s$, the nut is turned, and by reason of the oppositely-arranged pitch of its screw-threads, draws the wire E with great force. The wire E, so drawn, sinks the tire A into the circumferential groove $d$. In like manner, the other bead $a$ of the tire A is placed in the groove $c$ of the other flange $b$ and is fastened to the wheel-rim by the other wire E. As the tire A is wider than the wheel-rim B, it is bulged centrally throughout its entire length, into a concavo-convex position, as illustrated in Fig. 2 leaving an air space $x$ between its inner surface and the wheel-rim. The tightly-drawn and fastened wires E hold the tire A in such snug contact with the rim B as to form an air-tight connection on each side, around the entire circumference of the wheel. Air is then forced, in the usual manner, through the air tube D and fills the air space $x$. When the tire is fully inflated, the tube is closed by the screw-cap or plug. The expansive force of the air, thus confined between the tire and the rim, has a tendency to draw the beads $a$ of the tire more closely up to the wires E on each side, thus insuring the air-tight connection of the rim and tire.

As will be seen, the beads *a a* lie within the circumferential grooves *c c* of the flanges *b b*, and have the added function of auxiliary tires. When the wheel is running perpendicularly, it rests entirely on the central convexity of the pneumatic tire, and the tires *a a* are wholly clear of the ground; but whenever the wheel is inclined sidewise, either by the rider intentionally, as in turning a corner or rounding a curve, or accidentally, as when it slips or slides on wet ground, the auxiliary tire *a*, on the side which is inclined, comes in contact with the ground and the wheel then runs on both said auxiliary tire and upon the pneumatic tire. It is evident that this contact of both parts of the tire with the ground will prevent further slipping, as the point of support will shift inward, and at the same time, the auxiliary tire enables the wheel to preserve its equilibrium in describing the curve and so insures the safety of the rider.

It is obvious that the auxiliary tires need not be integral with the pneumatic tire, as shown, but will serve the purpose of auxiliary tires, if they are separate therefrom.

The air in the confined air-space *x* forms an air-cushion and gives great elasticity to the tire, and its pressure tends to preserve the outer rotundity of the tire. The tire thus possesses all the advantages of the tubular, pneumatic tire, commonly used, but is much cheaper and occupies less space.

I claim as a novel and useful invention and desire to secure by Letters Patent;

1. In combination with a wheel, having an elastic convex tire, a rim having flanges on each side, and auxiliary tires secured to said flanges, but less distant diametrically from the hub of the wheel than the central tire, substantially as and for the purposes specified.

2. The combination of a wheel, having the rim B, provided with circumferential flanges *b* and grooves *c d*, and also with the air-tube D with cap or plug, the elastic tire A, wider than the rim B, and provided with the rounded edges or beads *a*, which beads are adapted to fit within said grooves *c* of the flanges *b*, the wire-bands E, having oppositely threaded screw-ends and the nut F, having oppositely threaded screw-bores, adapted to unite and draw said wire bands so as to fasten the tire A in the grooves *d* of the rim B in an airtight contact, all arranged and combined to furnish the wheel with a central, pneumatic tire and auxiliary side tires, substantially as specified.

JOHN J. McCOMISH.

Witnesses:
 JAMES W. WILLIAMS,
 WARREN R. PERCE.